Oct. 25, 1932.  B. E. O'HAGAN  1,884,157
MOTOR CONTROL APPARATUS
Filed Jan. 14, 1930

INVENTOR:
B. E. O'Hagan,
by A. L. Vincill
His Attorney

Patented Oct. 25, 1932

1,884,157

UNITED STATES PATENT OFFICE

BERNARD E. O'HAGAN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

MOTOR CONTROL APPARATUS

Application filed January 14, 1930. Serial No. 420,690.

My invention relates to motor control apparatus, and particularly to apparatus for controlling a railway switch operating motor or the like from a remote point.

I will describe two forms of apparatus embodying my invention, and will then point out the novel features thereof in claims.

Figure 1:
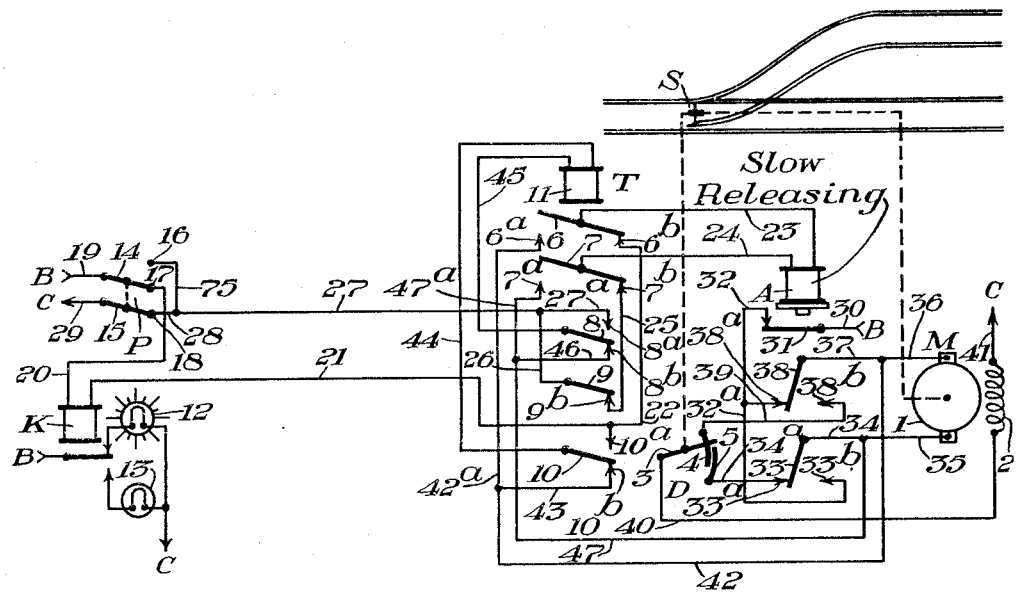
Figure 2:
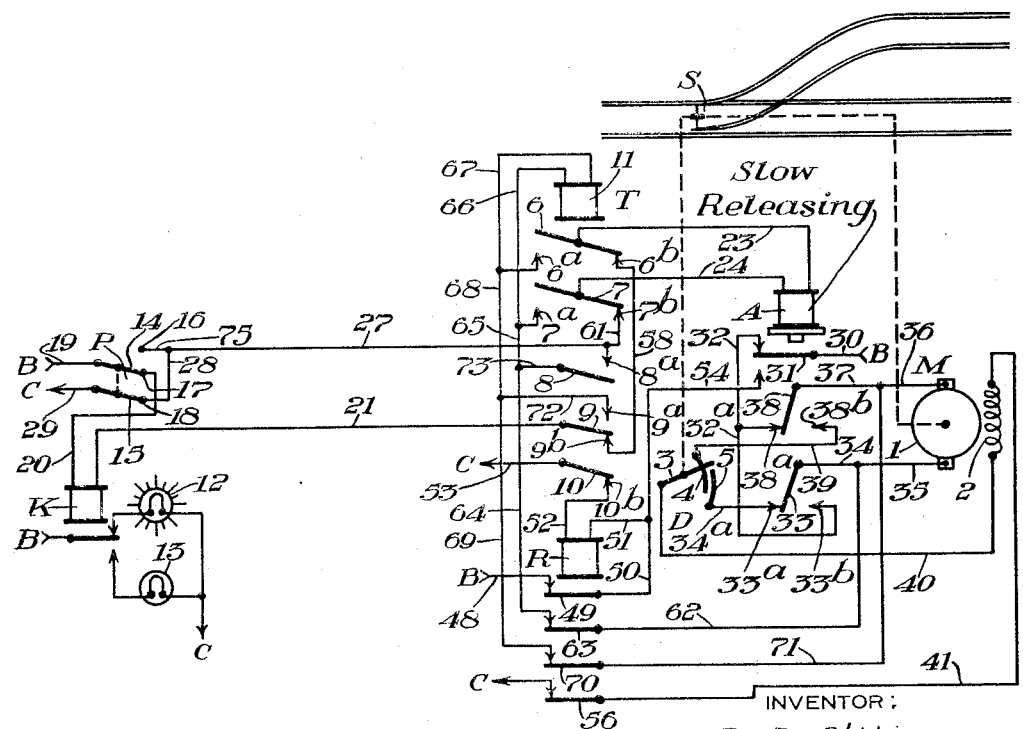

In the accompanying drawing, Fig. 1 is a diagrammatic view illustratng one form of apparatus embodying my invention applied to the control of an electric motor for operating a railway switch. Fig. 2 is a similar view showing a modified form of the apparatus illustrated in Fig. 1, and also embodying my invention.

Similar reference characters refer to similar parts in both views.

Referring first to Fig. 1, the reference character M designates an electric motor comprising, as usual, an armature 1 and a field 2. As here shown, the motor M controls a railway switch S through the medium of suitable operating mechanism forming no part of my invention, and therefore not shown in the drawing, but it will be readily understood that the motor M might be used to control any other suitable form of apparatus.

Associated with switch S is a circuit controller D comprising a contact 3—4 which is closed at all times except when the switch occupies its full reverse position, and a contact 3—5 which is closed at all times except when the switch occupies its full normal position, in which latter position it is illustrated in the drawing.

The motor M is controlled by the circuit controller D just described, and by a slow-releasing polarized relay A. The polarized relay A is so constructed that its polar armatures 38 and 33 will remain in the positions to which they were last moved until positively moved to different positions by energization of the relay with current of the proper polarity.

Associated with polarized relay A is a time element relay T which, in the form here shown, comprises a winding 11, and five armatures 6, 7, 8, 9 and 10 controlled by the winding 11. When winding 11 is de-energized, the armatures 6, 7, 8, 9 and 10 occupy the positions in which they are illustrated in the drawing; when winding 11 is supplied with current, however, the armature 6 alternately engages two fixed contacts $6^a$ and $6^b$ to close a contact 6—$6^a$ or 6—$6^b$, and the armature 7 alternately engages two fixed contacts $7^a$ and $7^b$ to close a contact 7—$7^a$ or 7—$7^b$, until a predetermined time interval has elapsed, whereupon, these armatures come to rest in the positions in which they are illustrated in the drawing, and the armatures 8, 9 and 10 pick up. One relay which will operate in this manner is described and claimed in an application for Letters Patent of the United States, filed by Branko Lazich and Harry E. Ashworth, on even date herewith, for electrical relays. The supply of current to winding 11 of relay T is controlled in part by its own armatures 8 and 10 in a manner which will be described in detail hereinafter.

Relay A is controlled by relay T and by a pole-changer P. The pole-changer P will usually be operated by a manual switch lever located in an interlocking machine at some central control point, such as a train despatcher's cabin.

Associated with pole-changer P is an indication relay K which may be used to control any suitable form of indicating apparatus in any suitable manner. As here shown, relay K controls two electric lamps 12 and 13 in such manner that lamp 12 is lighted when this relay is energized, but that lamp 13 is lighted when this relay is de-energized.

As shown in the drawing, switch S occupies its normal position so that contact 3—4 of circuit controller D is closed and contact 3—5 is open. Motor M is de-energized. Relay T is also de-energized and its contacts 6—$6^b$, 7—$7^b$, 8—$8^b$, 9—$9^b$, and 10—$10^b$ are therefore all closed, while its contacts 6—$6^a$, 7—$7^a$, 8—$8^a$ and 10—$10^a$ are all open. Contacts 14—17 and 15—18 of pole-changer P are closed. Current of what I shall call normal polarity is therefore supplied to relay A from one terminal B of a suitable source not shown in the drawing through wire 19, contact 14—17 of pole-changer P, wire 20, winding of relay K, line wire 21, wire 22, contact 6—$6^b$ of relay T, wire 23, winding of relay A, wire 24, contact 7—7ᵇ of relay T, wire 25 contact 9—9ᵇ of relay T, wire 26, line 27, wire 28, contact 15—18 of pole changer P, and wire 29 back to the other terminal C of the same source. Relay A is therefore energized in its normal direction so that its polar armatures 38 and 33 are swung to their lefthand positions, as illustrated in the drawing. It will be noted that relay K is connected in series with relay A in the circuit just traced for relay A, and relay K is therefore also energized, so that lamp 12 is lighted and lamp 13 is extinguished.

I will now assume that the operator wishes to reverse switch S. To do this, he reverses pole-changer P. Current of what I shall call reverse polarity then flows from terminal B, through wire 19, contact 14—16 of pole-changer P, wire 75, line wire 27, wire 26, contact 9—9ᵇ of relay T, wire 25, contact 7—7ᵇ of relay T, wire 24, winding of relay A, wire 23, contact 6—6ᵇ of relay T, wire 22, line wire 21, winding of relay K, wire 20, contact 15—17 of pole-changer P, and wire 29 to terminal C. Relay A therefore becomes energized in the reverse direction, swinging its polar armatures 38 and 33 from their lefthand positions to their right-hand positions. When this happens, a circuit is completed for motor M from terminal B, through wire 30, front contact 31 of relay A, wires 32 and 32ᵃ, reverse contact 33—33ᵇ of relay A, wires 34 and 35, armature 1 of motor M, wires 36 and 37, reverse contact 38—38ᵇ of relay A, wire 39, contact 3—4 of circuit controller D, wire 40, field 2 of motor M, and wire 41 to terminal C. Motor M therefore becomes energized and starts to move switch S from its normal position to its reverse position. As soon as motor M becomes energized, the potential drop across armature 1 is supplied to relay T by virtue of a circuit which may be traced from the lower terminal of armature 1 of motor M, through wires 35, 47 and 46, contact 8—8ᵇ of relay T, wire 45, winding 11 of relay T, wire 44, contact 10—10ᵇ of relay T, and wires 43, 42 and 36, to the upper terminal of armature 1. Relay T therefore also becomes energized. As pointed out hereinbefore, when relay T becomes energized, armature 6 alternately engages fixed contacts 6ᵃ and 6ᵇ to alternately close contacts 6—6ᵃ and 6—6ᵇ, and armature 7 alternately engages fixed contacts 7ᵃ and 7ᵇ to alternately close contacts 7—7ᵃ and 7—7ᵇ, until a predetermined time interval has elapsed, whereupon, these armatures come to rest in the positions shown, and armatures 8, 9 and 10 pick up. Each time contacts 6—6ᵇ and 7—7ᵇ become opened, the circuit for relay A, which was previously closed at these contacts, is opened, and each time contacts 6—6ᵃ and 7—7ᵃ become closed, an auxiliary circuit for relay A is closed, this latter circuit passing from the lower terminal of armature 1 of motor M, through wires 35, 47 and 47ᵃ, contact 7—7ᵃ of relay T, wire 24, winding of relay A, wire 23, contact 6—6ᵃ of relay T, and wires 42ᵃ, 42 and 36 to the upper terminal of armature 1. The parts are so arranged that the current supplied to relay A over both these circuits flows through the relay winding in the same direction, and relay A is made sufficiently slow-releasing so that it will not open its front contact 31 under these conditions. It will be apparent, therefore, that the operation of armatures 6 and 7 does not affect the operation of motor M. Each time the circuit for relay A including contacts 6—6ᵇ and 7—7ᵇ is opened, however, relay K becomes de-energized to extinguish lamp 12 and light lamp 13, so that the operation of the armatures 6 and 7 results in a flashing indication at the control point, whereby the operator is notified that the motor M is energized. Relay T is so designed that the time interval during which the armatures 6 and 7 operate before the armatures 8, 9 and 10 pick up will be, for example, three or four times as long as the time interval required for switch S to reverse under normal conditions, and it follows that this flashing indication will therefore normally continue until switch S has reached its full reverse position. When this happens, contact 3—4 of circuit controller D opens, thereby de-energizing motor M, and thus de-energizing relay T. Armatures 6 and 7 then come to rest in the positions shown, whereupon relay K becomes constantly energized, so that lamp 12 is again constantly lighted and lamp 13 extinguished, thus indicating that motor M is de-energized.

If, now, the operator at the control point wishes to restore switch S to its normal position, he may do so by again reversing polechanger P. Under these conditions, relay A is again supplied with current of normal polarity so that its reverse contacts 38—38ᵇ and 33—33ᵇ are opened and its normal contacts 38—38ᵃ and 33—33ᵃ become closed. Since contact 3—5 of circuit controller D is now closed, current is then supplied to motor M over a circuit which passes from terminal B through wire 30, front contact 31 of relay A, wire 32, normal contact 38—38ᵃ of relay A, wires 37 and 36, armature 1 of motor M wires 35 and 34, normal contact 33—33ᵃ of relay A, wire 34ᵃ, contact 3—5 of circuit controller D, wire 40, field 2 of motor M, and wire 41 to terminal C. Motor M therefore operates in the direction to move switch S from its reverse position to its normal position. As soon as motor M starts to operate, current is again supplied to relay T over the circuit previously traced for this relay, thereby causing relay K to energize lamps 12 and 13 alternately and thus indicate that motor M is energized. When the switch reaches its full normal position, contact 3—5 of circuit controller D opens, and de-energizes motor M. Relay T then becomes de-energized, so that relay K is steadily energized and lamp 12 is constantly lighted, indicating that motor M is de-energized.

If, for any reason, the motion of switch S is arrested when the switch is being operated from one extreme position to the other extreme position, so that the switch is prevented from reaching such other extreme position, relay T will continue to operate its armatures 6 and 7 until the time interval for which this relay is adjusted has expired, whereupon, these armatures will stop operating and the armatures 8, 9 and 10 will pick up. As long as armatures 6 and 7 continue to operate, the lamps 12 and 13 continue to flash alternately, and if this flashing lasts for a longer period to time than that ordinarily required to reverse switch S, the operator knows immediately that switch S is not operating in the normal manner. When armature 9 of relay T picks up, contact 9—9$^b$ is opened, so that the circuits over which relay A is normally energized are both opened, and since the auxiliary circuit for relay A is then also open at contacts 6—6$^a$ and 7—7$^a$ of relay T, relay A becomes de-energized. Front contact 31 of relay A therefore opens and de-energizes motor M, so that damage to the motor is prevented. When armatures 8 and 10 of relay T pick up, contacts 8—8$^b$ and 10—10$^b$ are opened, and contacts 8—8$^a$ and 10—10$^a$ become closed. The opening of contacts of 8—8$^b$ and 10—10$^b$ interrupts the circuit over which relay T is normally energized, but as soon as contacts 8—8$^a$ and 10—10$^a$ become closed, relay T is then supplied with current from line wires 27 and 21 over a circuit which passes from line wire 27 through wire 27$^a$, contact 8—8$^a$ of relay T, wire 45, winding 11 of relay T, wire 44, and contact 10—10$^a$ to line wire 21. The parts are so arranged that the current supplied to relay T from line wires 27 and 21, under these conditions, will flow through winding 11 in the same direction as the current which was supplied to relay T before the armatures 8, 9 and 10 picked up, and it follows that when the armatures 8, 9 and 10 are once picked up, they are subsequently held up until pole-changer P is operated to interrupt the supply of current to the line wires 27 and 21. As long as armature 9 is held up, relay A cannot be energized, and it will be apparent therefore that in order to again energize motor M after motor M has been de-energized, under the above conditions, it is necessary to operate pole-changer P to de-energize relay T. Since both contacts of circuit controller D are now closed, if pole-changer P is operated to de-energize relay T, motor M may then be energized in either direction by proper manipulation of pole-changer P.

Referring now to Fig. 2, in the modified form of apparatus here shown, I have provided, in addition to the apparatus illustrated in Fig. 1, a stick relay R which is controlled by relays A and T, and which, in turn controls the supply of current to motor M and in part to relay T.

As shown in Fig. 2, switch S occupies its normal position so that contact 3—4 of circuit controller D is closed and contact 3—5 is open. Motor M is de-energized. Relay T is also de-energized, and since contacts 14—17 and 15—18 of pole-changer P are closed, current flows from terminal B through wire 19, contact 14—17 of pole-changer P, wire 20, winding of relay K, line wire 21, contact 9—9$^b$ of relay T, wire 58, contact 6—6$^b$ of relay T, wire 23, winding of relay A, wire 24, contact 7—7$^b$ of relay T, wire 61, line wire 27, wire 28, contact 15—18 of pole-changer P, and wire 29 to terminal C. Relay A is therefore energized in the normal direction so that its front contact 31 is closed, and its polar armatures 38 and 33 are swung toward the left. Since relay K is connected in series with relay A in the circuit just traced, relay K is also energized, and lamp 12 is therefore lighted. Relay R is energized over its stick circuit which passes from terminal B, through wire 48, front contact 49 of relay R, wires 50 and 51, winding of relay R, wire 52, contact 10—10$^b$ of relay T and wire 53 to terminal C.

If, with the parts in the positions just described, the operator wishes to reverse switch S, he reverses pole-changer P. Current then flows from terminal B, through wire 19, contact 14—16 of pole-changer P, wire 75, line wire 27, wire 61, contact 7—7$^b$ of relay T, wire 24, winding of relay A, wire 23, contact 6—6$^b$ of relay T, wire 58, contact 9—9$^b$ of relay T, line wire 21, winding of relay K, wire 20, contact 15—17 of pole-changer P, and wire 29 to terminal C. Relay A therefore becomes energized in the reverse direction and swings its polar armatures 38 and 33 to their right-hand positions. A circuit is then completed for motor M which is exactly like the circuit which was completed for motor M in Fig. 1 when the armatures 38 and 33 of relay A were swung to their right-hand positions except that a front contact 56 of relay R is inserted in wire 41. Motor M therefore becomes energized and starts to move switch S from its normal to its reverse position. As soon as motor M becomes energized, the potential drop across armature 1 is impressed on winding 11 of relay T over a circuit passing from the lower terminal of armature 1 of motor M, through wires 35 and 62, front contact 63 of relay R, wires 64, 65 and 66, winding 11 of relay T, wires 67, 68 and 69, front contact 70 of relay R, and wires 71 and 36 to the upper terminal of armature 1. Relay T, therefore, becomes energized and its armatures 6 and 7 start to oscillate. Each time contacts 6—6ᵇ and 7—7ᵇ are opened, the circuit for relay A including these contacts is opened, and each time contacts 6—6ᵃ and 7—7ᵃ become closed, another circuit is closed for relay A, this latter circuit passing from the lower terminal of armature 1 of motor M, through wires 35 and 62, front contact 63 of relay R, wires 64 and 65, contact 7—7ᵃ of relay T, wire 24, winding of relay A, wire 23, contact 6—6ᵃ of relay T, wires 68 and 69, front contact 70 of relay R, and wires 71 and 36 back to the upper terminal of armature 1. For the reasons pointed out in connection with Fig. 1, relay A does not open its front contacts, under these conditions, but due to the operation of the armatures 6 and 7, relay K is alternately energized and deenergized so that the lamps 12 and 13 are alternately lighted, thus indicating that motor M is energized. If switch S operates in the normal manner, the lamps 12 and 13 will continue to be alternately lighted until switch S reaches its full reverse position. When this happens, motor M is de-energized, at contact 3—4 of circuit controller D, and relay T therefore also becomes de-energized. Relay K is then constantly energized, and lamp 12 becomes constantly lighted, thereby indicating that motor M is de-energized.

If the operator now wishes to restore switch S to its normal position, he again reverses pole-changer P. Relay A is then supplied with current of normal polarity so that its polar armatures 38 and 33 are swung to the left as shown in the drawing. Current is then supplied to motor M over a circuit which is exactly like that which was closed for motor M in Fig. 1, under similar conditions, except that front contact 56 of relay R is inserted in wire 41, and motor M therefore operates in the direction to restore switch S to its normal position. As soon as motor M becomes energized, relay T again becomes energized by virtue of the circuit previously traced for relay T, thereby causing relay K to alternately energize the lamps 12 and 13. When the switch reaches its full reverse position, contact 3—5 of circuit controller D opens and de-energizes motor M, thus de-energizing relay T. Relay K then becomes constantly energized and lamp 12 becomes constantly lighted to indicate that motor M is de-energized.

If, for any reason, the motion of switch S is arrested when the switch is being moved from one extreme position to the other extreme position so that the switch is prevented from reaching such other extreme position, relay T will continue to operate its armatures 6 and 7 until the time interval for which this relay is adjusted has expired, whereupon the armatures 6 and 7 will come to rest in the positions shown, and the armatures 8, 9 and 10 will pick up. As long as the armatures 6 and 7 continue to operate, the lamps 12 and 13 are alternately energized, and as pointed out in connection with Fig. 1, if this alternate energization of the lamps 12 and 13 lasts for a longer period of time than that normally required for switch S to reverse, the operator knows that switch S is not functioning in the normal manner. When the armatures 8, 9 and 10 pick up, all circuits for relay A are opened, and the stick circuit for relay R is also opened, so that both these relays become de-energized. The circut for motor M is then opened at front contact 31 of relay A and at front contact 56 of relay R so that motor M becomes de-energized. It will be apparent, therefore, that under these conditions, damage to the motor is prevented. When front contacts 63 and 70 of relay R are opened, the supply of current to relay T due to the potential drop across armature 1 of motor M is interrupted, but since armatures 8 and 9 are now picked up, relay T is supplied with current from line wires 27 and 21 over a circuit which may be traced from line wire 27, through contact 8—8ᵃ of relay T, wires 73, 65 and 66, winding 11 of relay T, wires 67, 68 and 72, and contact 9—9ᵇ of relay T to wire 21. The parts are so arranged that the current supplied to relay T from line wires 27 and 21, under these conditions, will have the same polarity as that supplied to the relay before armatures 8, 9 and 10 picked up, and the armatures 8, 9 and 10 are therefore held up. It will be apparent, therefore, that after motor M has been de-energized in this manner, the motor cannot again be energized until pole-changer P is operated to interrupt the supply of current to line wires 27 and 21. When this is done, relay T becomes de-energized and the armatures 8, 9 and 10 drop. A pick-up circuit for relay R is then closed from terminal B through wire 30, back contact 31 of relay A, wires 54 and 51, winding of relay R, wire 52, contact 10—10ᵇ of relay T, and wire 53 to terminal C. Relay R therefore picks up and closes its stick circuit so that this relay is subsequently held up. Since contact 9—9ᵇ of relay T is now closed, relay A may be energized in either direction by manipulation of pole-changer P. Motor M will then operate in the direction corresponding to the condition of relay A.

While I have shown apparatus embodying my invention as applied to the control of an electric motor for operating a railway switch, it will be readily understood that my invention is not limited to this use but that it may be applied to the control of any electric motor for operating any reciprocable device.

Although I have herein shown and described only two forms of motor control apparatus embodying my invention, it is understood that various changes and modifications may be made therein within the scope of the appended claims without departing from the spirit and scope of my invention.

Having thus described my invention, what I claim is:

1. In combination, a movable device, an electric motor for controlling said device, a first relay having a contact arranged to be operated at the expiration of a measured time interval after said first relay becomes energized, a second relay, means including said contact for energizing said second relay, means controlled by said second relay for energizing said motor, and means for energizing said first relay when said motor is energized.

2. In combination, a movable device, an electric motor for controlling said device, a first relay having a normally closed contact arranged to be opened at the expiration of a measured time interval after said first relay becomes energized, a second relay, means including said normally closed contact for energizing said second relay, means controlled by said second relay for energizing said motor, and means for energizing said first relay when said motor is energized.

3. In combination, a movable device, an electric motor for controlling said device, a first relay having a normally closed contact arranged to be opened at the expiration of a measured time interval after said first relay becomes energized, a second relay, means including said normally closed contact for energizing said second relay, means controlled by said second relay for energizing said motor, and means responsive to the potential drop across the armature of said motor for energizing said first relay.

4. In combination, a movable device, an electric motor for controlling said device, a first relay having two normally closed contacts arranged to be opened at the expiration of a measured time interval after said first relay becomes energized and a normally open contact arranged to be closed at the expiration of said time interval, a second relay, means controlled by said second relay for energizing said motor, a manually controlled circuit including one of said normally closed contacts for energizing said second relay, means including the other of said normally closed contacts for energizing said first relay when said motor is energized, and means including said normally open contact for at other times energizing said first relay.

5. A device, movable between a first and a second position, an electric motor for operating said device, a first contact which is closed at all times except when said device occupies its second position and a second contact which is closed at all times except when said device occupies its first position, a first relay having a normally closed contact arranged to be opened at the expiration of a predetermined time interval after said first relay becomes energized, a polarized relay, a manually controlled circuit including said normally closed contact for supplying said polarized relay with current of one polarity or the other, means including said first contact and effective when said polarized relay is supplied with current of one polarity for energizing said motor in the direction to move said device from said first position to said second position, means including said second contact and effective when said polarized relay is supplied with current of the other polarity for energizing said motor in the direction to move said device from said second position to said first position, and means for energizing said first relay when said motor is energized.

6. In combination, a movable device, a first relay for controlling said device, an indication relay, a circuit including said first relay and said indication relay in series, and means effective when said device is operated for periodically controlling said circuit in such manner that said indication relay is periodically de-energized but that said first relay remains energized.

7. In combination, a movable device, an electric motor for controlling said device, a first relay for controlling said motor, an indication relay, a circuit including said first relay and said indication relay in series, and means responsive to the potential drop across the armature of said motor for periodically controlling said circuit in such manner that said indication relay is periodically de-energized but that said first relay remains energized.

8. In combination, a movable device, an electric motor, a slow-releasing polarized relay for controlling said motor, a second relay having a normally closed contact arranged to be periodically opened during a measured time interval after energization of the relay, an indication relay, a circuit for said polarized relay including said normally closed contact and said indication relay in series, and means for energizing said second relay when and only when said motor is operating.

9. In combination, a movable device, an electric motor, a slow-releasing polarized relay, means controlled by said polarized relay for supplying said motor with current, a second relay having a normally closed contact arranged to be periodically opened during a measured time interval after energization of the relay, an indication relay, a circuit for said polarized relay including said normally closed contact and said indication relay in series, and means responsive to the potential drop across the armature of said motor for energizing said second relay.

10. In combination, a movable device, an electric motor for controlling said device, a slow-releasing polarized relay for controlling said motor, a second relay having a first normally closed contact arranged to be periodically opened during a measured time interval after energization of the relay, and a second contact arranged to be opened at the conclusion of said interval, an indication relay, a manually operable pole-changer; a circuit for said polarized relay controlled by said pole-changer and including said indication relay, said normally closed contact, and said second contact in series; and means for energizing said second relay when said motor is energized.

11. In combination, a movable device, a polarized relay, an electric motor for operating said device controlled by said polarized relay, a second relay having two normally closed contacts arranged to be opened at the expiration of a measured time interval after the relay becomes energized and a normally open contact arranged to be closed at the expiration of said interval, a manually operable pole-changer, a circuit for said polarized relay controlled by said pole-changer and including one of said normally closed contacts, a first circuit for said second relay including the other of said normally closed contacts and receiving energy due to the potential drop across the armature of said motor, and a second circuit for said second relay controlled by said pole-changer and including said normally open contact.

12. In combination, a railway switch having normal and reverse positions, an electric motor for operating said switch, a first contact which is closed at all times except when said switch occupies its reverse position and a second contact which is closed at all times except when said switch occupies its normal position, a slow-releasing polarized relay; a first circuit for said motor including said first contact, a front contact of said polarized relay, and reverse contacts of said polarized relay; a second circuit for said motor including said second contact, said front contact of said polarized relay, and normal contacts of said polarized relay; a time element relay having a first normally closed contact and a first normally open contact arranged to be alternately operated during a measured time interval after energization of the relay, a second and a third contact on said relay normally closed but arranged to be opened at the conclusion of said interval, and a second normally open contact of said relay arranged to be closed at the conclusion of said interval; an indication relay, a manually operable pole-changer; a first circuit for said polarized relay controlled by said pole-changer and including said indication relay, said first normally closed contact, and said second normally closed contact in series; a second circuit for said polarized relay including said first normally open contact and arranged to be supplied with current due to the potential drop across the armature of said motor when said motor is energized, a first circuit for said time element relay including said third normally closed contact and arranged to be supplied with current due to the potential drop across the armature of said motor when said motor is energized, and a second circuit for said time element relay controlled by said pole-changer and including said second normally open contact.

13. In combination, a movable device, an electric motor for operating said device, a polarized relay, means controlled by said polarized relay for controlling said motor, a second relay having two normally closed contacts arranged to be opened at the expiration of a measured time interval after energization of the relay, a manually controlled circuit including one of said normally closed contacts for controlling said polarized relay, a stick relay, a circuit for said second relay controlled by said stick relay and arranged to be supplied with current when and only when said motor is energized, a pick-up circuit for said stick relay controlled by said polarized relay and by the other of said normally closed contacts, and a stick circuit for said stick relay including a front contact of said stick relay and said other normally closed contact.

14. In combination, a movable device, an electric motor for operating said device, a polarized relay, a stick relay, means controlled by said polarized relay and by a front contact of said stick relay for controlling said motor, a time element relay having two normally closed contacts arranged to be opened at the expiration of a measured time interval after energization of the relay, a manually controlled circuit including one of said normally closed contacts for controlling said polarized relay, means including a front contact of said stick relay for supplying said time element relay with current when and only when said motor is energized, a pick-up circuit for said stick relay including a back contact of said polarized relay and the other of said normally closed contacts, and a stick circuit for said stick relay including a front contact of said stick relay and said other normally closed contact.

15. In combination, a railway switch having normal and reverse positions, an electric motor for operating said switch, a first contact arranged to be closed at all times except when said switch occupies a reverse position and a second contact arranged to be closed at all times except when said switch occupies its normal position, a slow-releasing polarized relay having front and back contacts and normal and reverse contacts, a stick relay; a first circuit for said motor including a front contact of said polarized relay, normal contacts of said polarized relay, said first contact, and a front contact of said stick relay; a second circuit for said motor including a front contact of said polarized relay, reverse contacts of said polarized relay, said second contact, and a front contact of said stick relay; a time element relay having two normally closed contacts arranged to be opened at the expiration of a measured time interval after energization of the relay and two normally open contacts arranged to be closed at the expiration of said time interval, a pick-up circuit for said stick relay including a back contact of said polarized relay and one of said normally closed contacts, a stick circuit for said stick relay including said one normally closed contact and a front contact of said stick relay, means including a front contact of said stick relay for supplying said time element relay with current in response to the potential drop across the armature of said motor, a manually controlled pole-changer, means controlled by said pole-changer and by said normally open contacts for at other times supplying said time element relay with current, and means controlled by said pole-changer and by the other of said normally closed contacts for controlling said polarized relay.

16. In combination, an electro-responsive device, a first relay having a contact arranged to be operated at the expiration of a measured time interval after said first relay becomes energized, a second relay, means including said contact for energizing said second relay, means controlled by said second relay for energizing said device, and means for energizing said first relay when said device is energized.

17 In combination, a movable device, a first relay for controlling said device, an indication relay, a circuit for energizing said first relay and said indication relay, and means effective when said device is operated for periodically controlling said circuit in such manner that said indication relay is deenergized but that said first relay remains energized.

18. In combination, an electric motor, a circuit for energizing said motor, a slow-releasing relay for controlling said motor circuit, a second relay having a normally closed contact arranged to be periodically opened during a measured time interval after energization of the relay, an indication relay, a circuit including said contact for energizing said slow-releasing relay and said indication relay, and means for energizing said second relay when said motor is energized.

In testimony whereof I affix my signature.

BERNARD E. O'HAGAN.